US012549998B2

(12) United States Patent
Tse et al.

(10) Patent No.: US 12,549,998 B2
(45) Date of Patent: Feb. 10, 2026

(54) SYSTEMS AND METHODS FOR CONGESTION AWARE POLICY ENFORCEMENT

(71) Applicant: Verizon Patent and Licensing Inc., Basking Ridge, NJ (US)

(72) Inventors: Lap Tse, Marietta, GA (US); David Taft, Keller, TX (US); Helen Osias Eglip, Sammamish, WA (US); Samirkumar Patel, Middlesex, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 10 days.

(21) Appl. No.: 18/737,197

(22) Filed: Jun. 7, 2024

(65) Prior Publication Data

US 2025/0380185 A1    Dec. 11, 2025

(51) Int. Cl.
*H04L 47/24* (2022.01)
*H04L 47/11* (2022.01)
*H04L 47/20* (2022.01)
*H04W 28/02* (2009.01)

(52) U.S. Cl.
CPC ......... *H04W 28/0289* (2013.01); *H04L 47/20* (2013.01)

(58) Field of Classification Search
CPC .... H04W 28/0289; H04L 47/20; H04L 47/24; H04L 47/11
USPC .......................................................... 709/238
See application file for complete search history.

(56) References Cited

U.S. PATENT DOCUMENTS

| 2016/0014635 A1* | 1/2016 | Räsänen | H04W 8/04 |
| | | | 370/230 |
| 2016/0134464 A1* | 5/2016 | Centonza | H04W 28/0247 |
| | | | 370/236 |
| 2023/0344774 A1* | 10/2023 | Abdelmalek | H04L 47/11 |

* cited by examiner

*Primary Examiner* — Jude Jean Gilles

(57) ABSTRACT

A device may include a processor configured to detect a Protocol Data Unit (PDU) session associated with a user equipment (UE) device. The processor may be further configured to obtain at least one congestion metric value for a base station associated with the PDU session; determine that the obtained at least one congestion metric value is less than a maximum throughput enforcement threshold; and override a maximum throughput enforcement policy on a User Plane Function (UPF) associated with the UE device, based on determining that the obtained at least one congestion metric value is less than the maximum throughput enforcement threshold.

20 Claims, 8 Drawing Sheets

SYSTEMS AND METHODS FOR CONGESTION AWARE POLICY ENFORCEMENT

BACKGROUND INFORMATION

To satisfy the needs and demands of users of mobile communication devices, providers of wireless communication services continue to improve and expand available services as well as networks used to deliver such services. One aspect of such improvements includes enabling mobile communication devices to access and use various services via the provider's communication network during different conditions. Managing a wireless communication service over time during different conditions may pose various difficulties.

DETAILED DESCRIPTION OF PREFERRED EMBODIMENTS

Figure 1:
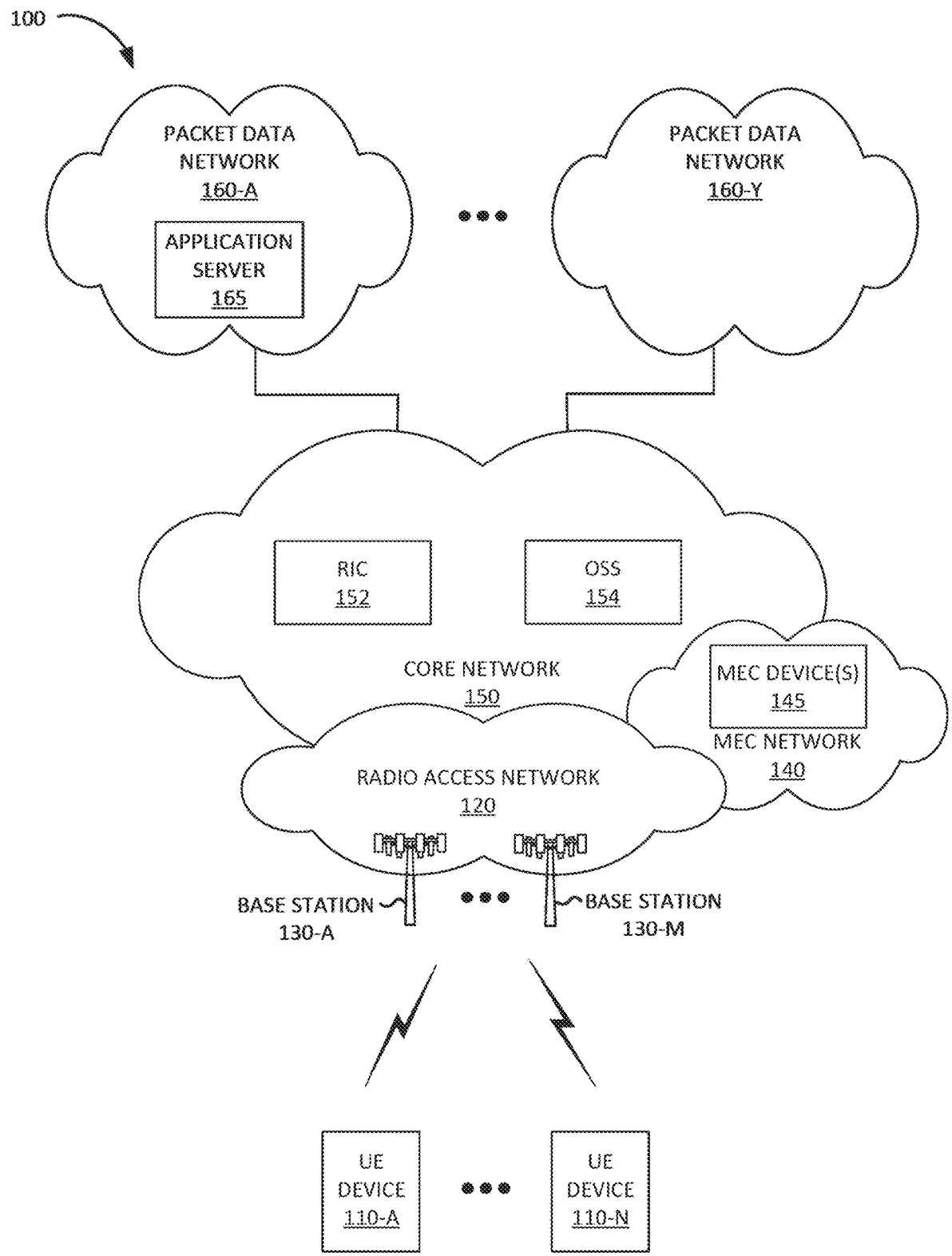
FIG. 1 illustrates an environment according to an implementation described herein.

The following detailed description refers to the accompanying drawings. The same reference numbers in different drawings identify the same or similar elements.

Providers of wireless communication services operate radio access networks (RANs) that include base stations. The base stations enable wireless communication devices (e.g., smart phones, etc.), referred to as user equipment (UE) devices (also herein referred to as UEs), to connect to networks and obtain services via the provider's core network, such as a Fifth Generation (5G) core network, a Fourth Generation (4G) core network, and/or other next generation networks as defined by the $3^{rd}$ Generation Partnership Project (3GPP). 5G coverage may be provided using 5G base stations, referred to as gNodeBs, implementing the 5G New Radio (NR) air interface. In order to establish a communication session, a UE device may establish a Protocol Data Unit (PDU) session in the core network via the RAN. The UE device may then establish one or more data flows in the PDU session. Each data flow may be associated with a Quality of Service (QOS) and/or other types of service requirements.

An important feature of next generation cellular wireless networks, such as, for example, a 5G network, used to meet requirements for different types of communication services, is network slicing. Network slicing is a form of virtual network architecture that enables multiple logical networks to be implemented on top of a common shared physical infrastructure using software defined networking (SDN) and/or network function virtualization (NFV). Each logical network, referred to as a "network slice," may encompass an end-to-end virtual network with dedicated storage and/or computation resources. Each network slice may be configured to implement a different set of requirements and/or priorities and/or may be associated with a particular QoS class, a type of service, security requirements, and/or a particular enterprise customer associated with a set of UE devices. For example, a 5G network may include an enhanced Mobile Broadband (eMBB) network slice for Voice over Internet Protocol (VOIP) telephone calls and/or data sessions for accessing Internet websites, a massive Internet of Things (IoT) network slice for IoT communication, an Ultra-Reliable Low Latency Communication (URLLC) network slice for mission critical low latency communication, a low latency real-time gaming network slice for online video games, etc. Each type of wireless communication service may be associated with a different set of requirements and/or different policies.

A network slice may be associated with a policy that limits a performance parameter, such as throughput, latency, jitter, and/or another type of performance parameter. For example, a low latency real-time gaming network slice may be associated with a maximum throughput policy, such as an Aggregate Maximum Bit Rate (AMBR). A maximum throughput policy may be applied to a network slice to, for example, limit potential abuse of network resources by users that violate service agreements. However, indiscriminate application of a maximum throughput policy may reduce the quality of the user experience on the network slice, particularly in situations where the network resources of the network slice are not near capacity.

Implementations described herein relate to systems and methods for congestion aware policy enforcement. A Congestion and Service Level Aware Function (CSLAF) in a core network associated with a RAN may be configured to override a service level policy based on a congestion metric. A service level policy that is overridden is not applied while being overridden. For example, a CSLAF device may be configured to detect a PDU session associated with a UE device, obtain at least one congestion metric value for a base station associated with the PDU session, and determine whether the obtained at least one congestion metric value is less than a maximum throughput enforcement threshold. If the obtained at least one congestion metric value is less than a maximum throughput enforcement threshold, the CSLAF device may be configured to override a maximum throughput enforcement policy on a User Plane Function (UPF) associated with the UE device. If the obtained at least one congestion metric value is not less than a maximum throughput enforcement threshold, the maximum throughput enforcement policy may not be overridden and thus may be applied to the PDU session.

The maximum throughput enforcement policy may be associated with a particular network slice, such as, for example, a low latency gaming network slice, and the CSLAF device may determine whether to override the maximum throughput enforcement policy for PDU sessions on the particular network slice.

The congestion metric value may include, for example, a Physical Resource Block (PRB) utilization rate for a radio frequency (RF) band used by the base station, a processor load associated with the base station, a memory utilization rate associated with the base station, a temperature associated with the base station, and/or another type of metric that may be used as a measure of congestion and/or load experienced by the base station.

The CSLAF device may be further configured to determine whether to initiate deep packet inspection on the PDU session. For example, the CSLAF device may be configured to detect a triggering condition for performing a deep packet inspection on the PDU session and initiate the deep packet inspection on the PDU session, in response to detecting the triggering condition. Detecting the triggering condition may include, for example, detecting that a duration of the PDU session has exceeded a duration threshold, detecting that an amount of data sent by the UE device via the PDU session has exceeded an upload threshold, detecting an uplink buffer load that is greater than an uplink buffer load threshold, detecting an unrecognized Data Network Name (DNN), and/or detecting another type of triggering condition.

The CSLAF device may instruct the UPF associated with the PDU session to perform the deep packet inspection on the PDU session and may receive deep packet inspection information from the UPF. The CSLAF device may analyze the received deep packet inspection information and determine whether an action is to be performed as a result of the analysis. For example, the CSLAF device may detect a throughput enforcement triggering condition based on the deep packet inspection and cease to override the maximum throughput enforcement policy on the UPF associated with the UE device, in response to detecting the throughput enforcement triggering condition. Detecting the throughput enforcement triggering condition may include obtaining a parameter value range for a data traffic parameter for a network slice associated with the PDU session, obtaining a parameter value for the data traffic parameter for the PDU session, and determining that the obtained parameter value is outside the obtained parameter value range for the data traffic parameter.

Furthermore, the CSLAF device may detect an alerting condition based on the deep packet inspection and send an alert to an Operations Support System (OSS) based on detecting the alerting condition. Detecting the alerting condition may include, for example, detecting malware based on the deep packet inspection, detecting peer-to-peer file sharing based on the deep packet inspection, detecting illegal content based on the deep packet inspection, detecting a training data poisoning attack based on the deep packet inspection, and/or detecting another type of alerting condition.

In some implementations, the CSLAF device may be further configured to determine whether to override the maximum throughput enforcement policy based on a congestion level in the core network. For example, the CSLAF device may obtain a congestion metric value for the UPF, determine that the obtained congestion metric value for the UPF is less than a UPF congestion threshold, and override the maximum throughput enforcement policy on the UPF associated with the UE device based on determining that the obtained congestion metric value for the UPF is less than the UPF congestion threshold.

The CSLAF device may continue to monitor the congestion metric for the base station and/or the congestion metric for the UPF to determine whether to continue overriding the maximum throughput enforcement policy on the UPF. For example, the CSLAF device may obtain another congestion metric value for the base station, determine that the obtained other congestion metric value greater than the maximum throughput enforcement threshold and cease to override the maximum throughput enforcement policy on the UPF associated with the UE device, in response to determining that the obtained other congestion metric value is greater than the maximum throughput enforcement threshold.

Furthermore, in some implementations, the CSLAF device may be further configured to override a latency enforcement policy, a jitter enforcement policy, and/or a different type of enforcement policy based on determining that an obtained congestion metric value is less than a maximum throughput enforcement threshold.

FIG. 1 is a diagram of an exemplary environment 100 in which the systems and/or methods described herein may be implemented. As shown in FIG. 1, environment 100 may include UE devices 110-A to 110-N (referred to herein collectively as "UE devices 110" and individually as "UE device 110"), a RAN 120 that includes base stations 130-A to 130-M (referred to herein collectively as "base stations 130" and individually as "base station 130"), a Multi-Access Edge Computing (MEC) network 140, a core network 150, and packet data networks (PDNs) 160-A to 160-Y (referred to herein collectively as "PDNs 160" and individually as "PDN 160").

UE device 110 may include any mobile device with cellular wireless communication functionality. UE device 110 may include a handheld wireless communication device (e.g., a mobile phone, a smart phone, a tablet device, etc.); a wearable computer device (e.g., a head-mounted display computer device, a wristwatch computer device, etc.); a laptop computer, a tablet computer, a portable gaming system, and/or another type of portable computer; a Fixed Wireless Access (FWA) device; and/or any other type of mobile computer device with cellular wireless communication capabilities. In some implementations, UE device 110 may communicate using machine-to-machine (M2M) communication, such as Machine Type Communication (MTC), and/or another type of M2M communication for IoT applications.

RAN 120 may include base stations 130 and be managed by a provider of wireless communication services. RAN 120 may enable UE devices 110 to connect to core network 150 via base stations 130 using cellular wireless signals. For example, RAN 120 may include one or more central units (CUs), distributed units (DUs), and/or Radio Units (RUs) (not shown in FIG. 1) that enable and manage connections from RUs to core network 150. RAN 120 may include features associated with an LTE Advanced (LTE-A) network and/or a 5G network or other advanced network, such as features for or associated with management of 5G NR base stations; carrier aggregation; advanced or massive MIMO configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 Megahertz (MHz) wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Base station 130 may include a 5G NR base station (e.g., a gNodeB) and/or a 4G Long Term Evolution (LTE) base station (e.g., an eNodeB). Base stations 130 may include devices and/or components configured to enable cellular wireless communication with UE devices 110. For example, base stations 130 may include a radio frequency (RF)

transceiver configured to communicate with UE devices 110 using a 5G NR air interface using a 5G NR protocol stack, a 4G LTE air interface using a 4G LTE protocol stack, and/or using another type of cellular air interface.

MEC network 140 may be associated with RAN 120 and may provide MEC services for UE devices 110 attached to base stations 130. MEC network 140 may be in proximity to base stations 130 from a geographic and network topology perspective, thus enabling low latency services to be provided to UE devices 110. As an example, MEC network 140 may be located on the same site as base station 130. As another example, MEC network 140 may be geographically closer to one of base stations 130 and reachable via fewer network hops and/or fewer switches, than other base stations 130.

MEC network 140 may include one or more MEC devices 145. MEC devices 145 may provide MEC services to UE devices 110. A MEC service may include, for example, a low-latency microservice associated with a particular application, a microservice associated with a virtualized network function (VNF) of core network 150, a cloud computing service, such as cache storage service, artificial intelligence (AI) accelerator service, machine learning service, an image processing service, a data compression service, a locally centralized gaming service, a Graphics Processing Units (GPUs) and/or other types of hardware accelerator service, and/or other types of cloud computing services.

Core network 150 may be managed by the provider of cellular wireless communication services and may manage communication sessions of subscribers connecting to core network 150 via RAN 120 and/or another network (e.g., a WLAN). For example, core network 150 may establish an Internet Protocol (IP) connection between UE devices 110 and PDN 160. The components of core network 150 may be implemented as dedicated hardware components and/or as Virtual Network Functions (VNFs) implemented on top of a common shared physical infrastructure using Software Defined Networking (SDN). For example, an SDN controller may implement one or more of the components of core network 150 using an adapter implementing a VNF virtual machine, a Cloud-Native Network Function (CNF) container, an event driven serverless architecture, and/or another type of SDN architecture. The common shared physical infrastructure may be implemented using one or more devices 300 described below with reference to FIG. 3 in a cloud computing center associated with core network 150. Additionally, or alternatively, at least some of the components of core network 150 may be implemented using MEC devices 145 in MEC network 140. Exemplary components that may be included in core network 150 are described below with reference to FIG. 2.

Core network 150 may include a RAN Intelligent Controller (RIC) 152 and OSS 154. RIC 152 may obtain values for metrics, also referred to as Key Performance Indicators (KPI), from base stations 130. The metrics for which RIC 152 collects values may include congestion metrics, such as a PRB resource utilization rate, processor load, memory utilization rate, processor temperature, etc. RIC 152 may provide congestion metric values associated with base station 130 to a CSLAF device in core network 150. OSS 154 may monitor, control, analyze, and/or manage various aspects of RAN 120 and/or core network 150. For example, OSS 154 may detect and/or respond to alerts relating to security threats, service agreement violations, unauthorized use, etc. in RAN 120 and/or core network 150. OSS 154 may automatically act on an alert by, for example, ending a PDU session, siloing a PDU session, disconnecting a particular UE device 110, etc. Additionally, or alternatively, OSS 154 may forward an alert to a human operator. OSS 154 may receive alerts from a CSLAF device in core network 150.

PDNs 160-A to 160-Y may each be associated with a Data Network Name (DNN) in 5G, and/or an Access Point Name (APN) in 4G. UE device 110 may request a connection to PDN 160 using a DNN or an APN. For example, UE device 110 may request a data flow connection to an application server 165 (shown in PDN 160-A). PDN 160 may include, and/or be connected to, a local area network (LAN), a wide area network (WAN), a metropolitan area network (MAN), an autonomous system (AS) on the Internet, an optical network, a cable television network, a satellite network, a wireless network, an ad hoc network, a telephone network (e.g., the Public Switched Telephone Network (PSTN) or a cellular network), an intranet, or a combination of networks. PDN 160 may include application server 165. Application server 165 may include one or more computer devices that host one or more applications and/or other types of services used by UE device 110. Core network 150 may establish a data flow session between UE device 110 and application server 165 via RAN 120.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
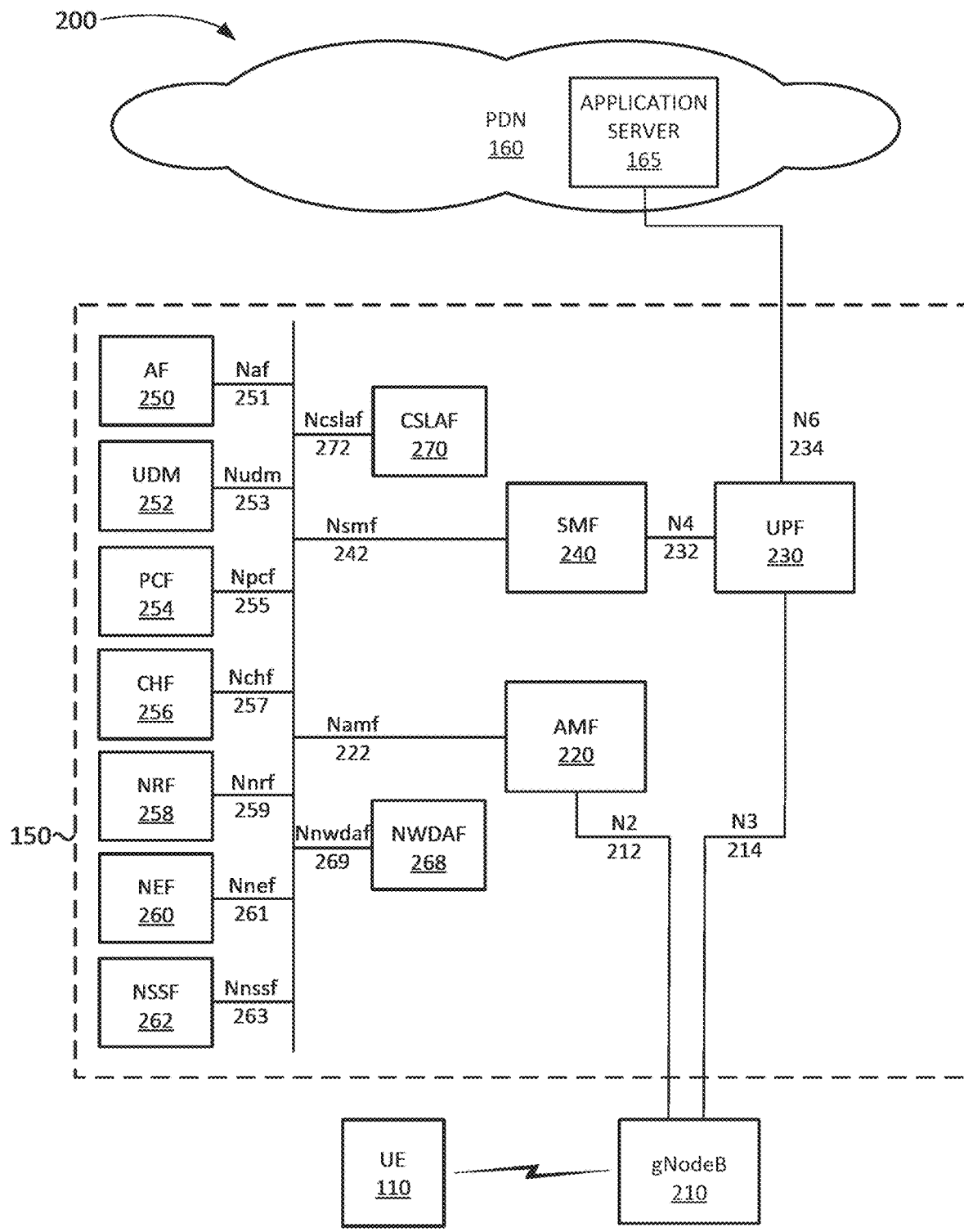
FIG. 2 illustrates exemplary components of a Fifth Generation (5G) core network according to an implementation described herein.

FIG. 2 illustrates an environment 200 in which core network 150 includes a 5G core network. As shown in FIG. 2, environment 200 includes UE device 110, gNodeB 210, core network 150, and PDN 160. gNodeB 210 may be implemented by base station 130. Core network 150 may include an Access and Mobility Management Function (AMF) 220, a UPF 230, a Session Management Function (SMF) 240, an Application Function (AF) 250, a Unified Data Management (UDM) 252, a Policy Charging Function (PCF) 254, a Charging Function (CHF) 256, a Network Repository Function (NRF) 258, a Network Exposure Function (NEF) 260, a Network Slice Selection Function (NSSF) 262, a Network Data Analytics Function (NWDAF) 268, and a CSLAF 270. While FIG. 2 depicts a single AMF 220, UPF 230, SMF 240, AF 250, UDM 252, PCF 254, CHF 256, NRF 258, NEF 260, NSSF 262, NWDAF 268, and CSLAF 270 for illustration purposes, in practice, core network 150 may include multiple AMFs 220, UPFs 230, SMFs 240, AFs 250, UDMs 252, PCFs 254, CHFs 256, NRFs 258, NEFs 260, NSSFs 262, NWDAFs 268, and/or CSLAFs 270.

AMF 220 may perform registration management, connection management, reachability management, mobility management, lawful intercepts, session management messages transport between UE device 110 and SMF 240, access authentication and authorization, location services management, support non-3GPP access networks, and/or other types of management processes. AMF 220 may be accessible by other function nodes via an Namf interface 222. AMF 220 may communicate with gNodeB 210 via an N2 interface 212.

UPF 230 may maintain an anchor point for intra/inter-Radio Access Technology (RAT) mobility, function as a gateway to a particular PDN 160, perform packet routing and forwarding, perform the user plane part of policy rule enforcement, perform deep packet inspection, perform lawful intercept, perform traffic usage reporting, perform Quality of Service (QoS) handling in the user plane, perform uplink traffic verification, perform transport level packet marking, perform downlink packet buffering, forward an "end marker" to a RAN node (e.g., gNodeB 210), and/or perform other types of user plane processes. UPF 230 may communicate with gNodeB 210 using an N3 interface 214, communicate with SMF 240 using an N4 interface 232, and connect to PDN 160 using an N6 interface 234.

SMF 240 may perform session establishment, session modification, and/or session release, apply policies received from PCF 254 to data flows, perform IP address allocation and management, perform Dynamic Host Configuration Protocol (DHCP) functions, perform selection and control of UPF 230, configure traffic steering at UPF 230 to guide the traffic to the correct destinations, perform lawful intercepts, charge data collection, support charging interfaces, control and coordinate charging data collection, terminate session management parts of Non-Access Stratum messages, perform downlink data notification, manage roaming functionality, and/or perform other types of control plane processes for managing user plane data. SMF 240 may be accessible via an Nsmf interface 242.

AF 250 may provide services associated with a particular application, such as, for example, an application for influencing traffic routing, an application for accessing NEF 260, an application for interacting with a policy framework for policy control, and/or other types of applications. AF 250 may be accessible via an Naf interface 251, also referred to as an NG5 interface. In some implementations, AF 250 may correspond to, or interface with, application server 165.

UDM 252 may maintain subscription information for UE devices 110, manage subscriptions, generate authentication credentials, handle user identification, perform access authorization based on subscription data, maintain service and/or session continuity by maintaining assignment of SMF 240 for ongoing sessions, support lawful intercept functionality, and/or perform other processes associated with managing user data. UDM 252 may interface with a Unified Data Repository (UDR) that stores subscription profiles for UE devices 110. UDM 252 may be accessible via a Nudm interface 253.

PCF 254 may support policies to control network behavior, provide policy rules to control plane functions (e.g., to SMF 240) and/or access and mobility functions (e.g., to AMF 220), provide a UE device Route Selection Policy (URSP) to UE device 110, access subscription information relevant to policy decisions, perform policy decisions, and/or perform other types of processes associated with policy enforcement. PCF 254 may be accessible via Npcf interface 255. CHF 256 may perform charging and/or billing functions for core network 140. CHF 256 may be accessible via Nchf interface 257.

NRF 258 may support a service discovery function and maintain profiles of available network function (NF) instances and their supported services. NRF 258 may be accessible via an Nnrf interface 259. NRF 258 may store, for each particular SMF 240, information identifying a range of IP addresses or an IP index associated with the particular SMF 240. NEF 260 may expose services, capabilities, and/or events to other NFs, including third party NFs, AFs 250, edge computing NFs, and/or other types of NFs. Furthermore, NEF 260 may secure provisioning of information from external applications to core network 150, translate information between core network 150 and devices/networks external to core network 150, support a Packet Flow Description (PFD) function, and/or perform other types of network exposure functions. NEF 260 may be accessible via an Nnef interface 261.

NSSF 262 may select a set of network slice instances to serve a particular UE device 110, determine network slice selection assistance information (NSSAI), determine a particular AMF 220 to serve a particular UE device 110, and/or perform other types of processing associated with network slice selection or management. NSSF 262 may provide a list of allowed slices for a particular UE device 110 to UDM 252 to store in a subscription profile associated with the particular UE device 110. NSSF 262 may be accessible via Nnssf interface 263. NWDAF 268 may collect analytics information associated with RAN 120 and/or core network 150. For example, NWDAF 268 may collect and/or obtain metrics/KPIs information relating to UE device 110 in RAN 130 and/or core network 150. NWDAF 268 may be accessible via Nnwdaf interface 269.

CSLAF 270 may be configured to override a service level policy on a PDU session based on a congestion metric associated with RAN 120 and/or core network 150. CSLAF 270 may register with NRF 258. CSLAF 270 may obtain congestion metric values associated with base stations 130 from RIC 152 (e.g., via AF 250, etc.); obtain congestion metric values associated core network 150 from NWDAF 268; obtain service level policy information from PCF 254; obtain PDU session information from AMF 220, UPF 230, and/or SMF 240; and determine whether to override a service level policy, such as a maximum throughput policy, based on the obtained information. Furthermore, CSLAF 270 may determine whether to initiate deep packet inspection for a PDU session, instruct UPF 230 to perform deep packet inspections, obtain deep packet inspection information from UPF 230, and make a determination based on the obtained deep packet inspection information. For example, CSLAF 270 my determine whether to override a service level policy and/or generate an alert based on the deep packet inspection information. CSLAF 270 may be accessible via Ncslaf interface 272.

Although FIG. 2 shows exemplary components of core network 150, in other implementations, core network 150 may include fewer components, different components, differently arranged components, or additional components than depicted in FIG. 2. Additionally, or alternatively, one or more components of core network 150 may perform functions described as being performed by one or more other components of core network 150. Furthermore, while particular interfaces have been described with respect to particular function nodes in FIG. 2, additionally, or alternatively, core network 150 may include a reference point architecture that includes point-to-point interfaces between particular function nodes.

Figure 3:
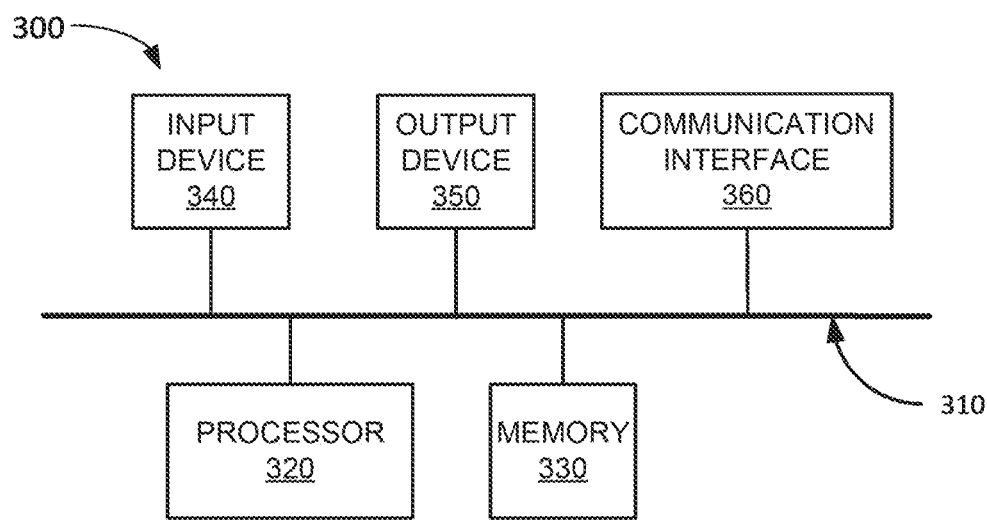
FIG. 3 illustrates exemplary components of a device that may be included in an environment according to an implementation described herein.

FIG. 3 is a diagram illustrating example components of a device 300 according to an implementation described herein. The components of FIG. 1 and/or FIG. 2 may each include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, central processing unit (CPU), graphics processing unit (GPU), tensor processing unit (TPU), hardware accelerator, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some implementations, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying content to the user. In some implementations, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to RF signals and/or a receiver that converts RF signals to baseband signals. Communication interface 360 may be coupled to an antenna for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to congestion aware policy enforcement. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally, or alternatively, one or more components of device 300 may perform one or more tasks described as being performed by one or more other components of device 300.

Figure 4:
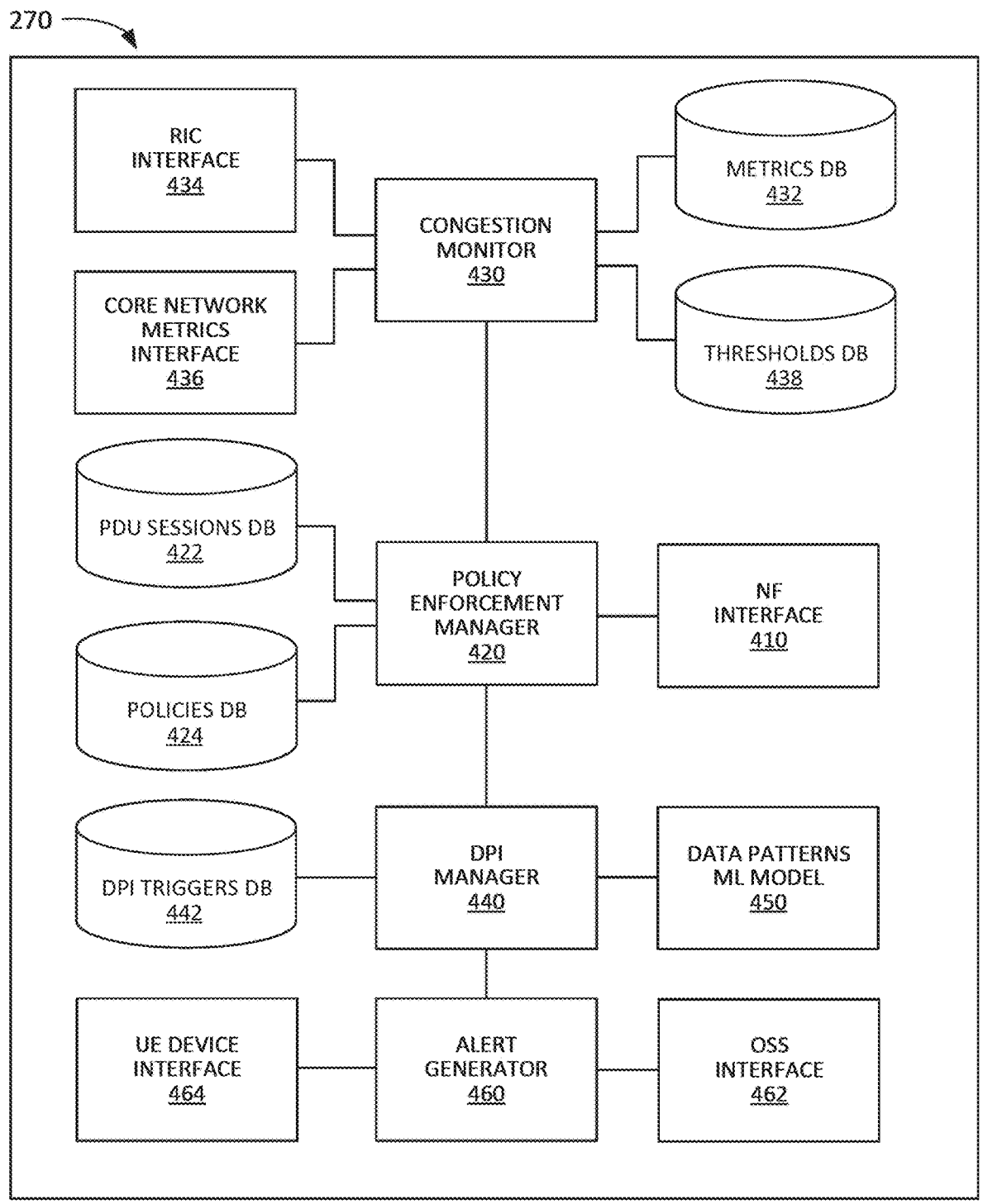
FIG. 4 illustrates exemplary components of a Congestion and Service Level Aware Function (CSLAF) device according to an implementation described herein.

FIG. 4 illustrates exemplary components of CSLAF 270. The components of CSLAF 270 may be implemented, for example, via processor 320 executing instructions from memory 330. For example, one or more components of CSLAF 270 may correspond to the structure of processor 320 together with instructions in memory 330 for implementing the functionality of the component. Alternatively, some or all of the components of CSLAF 270 may be implemented via hard-wired circuitry. For example, one or more components of CSLAF 270 may correspond to the structure of some or all of an ASIC, FPGA, and/or another type of integrated circuit. As shown in FIG. 4, CSLAF 270 may include an NF interface 410, a policy enforcement manager 420, a PDU sessions database (DB) 422, a policies DB 424, a congestion monitor 430, a metrics DB 432, a RIC interface 434, a core network metrics interface 436, a thresholds DB 438, a deep packet inspection (DPI) manager 440, a DPI triggers DB 442, a data patterns machine learning (ML) model 450, an alert generator 460, an OSS interface 462, and a UE device interface 464.

NF interface 410 may be configured to interface with other NFs in core network 150. For example, NF interface 410 may be configured to interface with AMF 220 and/or SMF 240 to obtain information relating to a PDU session, interface with UPF 230 to initiate DPI at UPF 230 and/or to obtain DPI information from UPF 230, interface with PCF 254 to obtain enforcement policies associated with a network slice, interface with NSSF 262 to identify a network slice associated with the PDU session, interface with UDM 252 to obtain subscriber information for UE device 110 associated with the PDU session, and/or interface with NWDAF 268 to obtain core network congestion metrics associated with UPF 230. NF interface 410 may provide information obtained from other NFs in core network 150 to policy enforcement manager 420.

Policy enforcement manager 420 may determine whether a policy associated with a network slice should be enforced or overridden for a PDU session. For example, policy enforcement manager 420 may determine whether base station 130 and/or UPF 230, associated with a PDU session, are experiencing congestion. Policy enforcement manager 420 may obtain an indication from congestion monitor 430 as to whether base station 130 and/or UPF 230 associated with the PDU session is in a congestion state based on congestion metrics associated with base station 130 and/or UPF 230 and based on one or more congestion metric thresholds. If base station 130 and/or UPF 230 is determined to not be in a congestion state, policy enforcement manager 420 may instruct UPF 230, associated with the PDU session, not to enforce a maximum throughput enforcement policy (and/or another type of enforcement policy associated with a network slice). If base station 130 and/or UPF 230 is determined to be in a congestion state, policy enforcement manager 420 may not override the maximum throughput enforcement policy (and/or another type of enforcement policy associated with a network slice) and the maximum throughput enforcement policy may be enforced by UPF 230 associated with the PDU session. Furthermore, policy enforcement manager 420 may determine whether to enforce a maximum throughput enforcement policy (and/or another type of enforcement policy associated with a network slice) based on DPI information obtained from UPF 230 and/or analyzed by DPI manager 440.

PDU sessions DB 422 may store information associated with PDU sessions in core network 150. Exemplary information that may be stored in PDU sessions DB 422 is described below with reference to FIG. 5. Policies DB 424 may store information relating to enforcement policies associated with particular network slices in core network 150.

Congestion monitor 430 may monitor for congestion conditions associated with RAN 120 and/or core network 150. Congestion monitor 430 may obtain congestion metrics associated with base stations 130 from RIC interface 434 and/or congestion metrics associated with UPFs 230 from core network metrics interface 436. Congestion monitor 430 may store the obtained congestion metrics in metrics DB 432.

Metrics DB 432 may store, for base station 130, values for congestion metrics such as, for example, PRB utilization rates for particular transmission bands used by base station 130, scheduler loads for particular transmission bands used by base station 130, a processor load associated with base station 130, a memory utilization rate associated with base station 130, a temperature associated with base station 130, etc. Metrics DB 432 may store, for UPF 230, values for congestion metrics such as, for example, a throughput rate for UPF 230, a packet loss rate for UPF 230, a latency value for UPF 230, a jitter value for UPF 230, a percent of available capacity for UPF 230, a processor load for UPF 230, a memory utilization rate for UPF 230, a forwarding buffer load for UPF 230, etc.

RIC interface 434 may be configured to communicate with RIC 152. For example, RIC interface 434 may obtain congestion metric values for base station 130, associated with a PDU session, from RIC 152. Core network metrics interface 436 may be configured to communicate with NWDAF 268 to obtain congestion metric values for UPF 230 associated with a PDU session.

Thresholds DB 438 may store one or more thresholds for congestion metrics associated with base station 130 and/or UPF 230. For example, thresholds DB 438 may store a threshold for each congestion metric that is used to determine whether base station 130 and/or UPF 230 is in a congested state. Different network slices may be associated with different sets of thresholds. Determination of a congested state may be determined based on a particular set of thresholds. As an example, to detect a congested state, congestion monitor 430 may determine that a single threshold is satisfied (e.g., a PRB utilization rate threshold for a particular transmission band), that multiple thresholds are satisfied, that at least a particular number of thresholds from a set of thresholds are satisfied, etc. As another example, a threshold may be compared to a weighted average of a set of congestion metric values, such as, for example, PRB utilization rates for different transmission bands.

Congestion monitor 430 may select a PDU session and identify base station 130 and/or UPF 230 associated with the selected PDU session. Congestion monitor 430 may then compare congestion metric values for the identified base station 130 and/or UPF 230 to one or more thresholds stored in thresholds DB 438 to determine whether the identified base station 130 and/or UPF 230 is in a congested state. Congestion monitor 430 may provide information indicating whether the identified base station 130 and/or UPF 230 is in a congested state to policy enforcement manager 420.

DPI manager 440 may determine whether to activate DPI for a PDU session based on trigger conditions identified in DPI triggers DB 442. DPI triggers DB 442 may store information identifying a set of triggers for activating DPI for a PDU session. Triggers for activating DPI for a PDU session may include, for example, a PDU session duration longer than a duration threshold, a PDU session total amount of uplink data sent greater than an uplink data amount threshold, a PDU session uplink buffer load greater than an uplink data buffer size threshold, an unrecognized DNN (e.g., a DNN that is not on a whitelist associated with a network slice, etc.), and/or other types of trigger conditions. If a trigger condition is detected for a PDU session, DPI manager 440 may inform policy enforcement manager 420 and policy enforcement manager 420 may instruct UPF 330 associated with the PDU session to initiate DPI on the PDU session.

Data patterns ML model 450 may include an ML model, such as, for example, a deep learning neural network model, trained to identify data patterns associated with service agreement violations. In some implementations, data patterns ML model 450 may be provided to UPF 230. In other implementations, UPF 230 may send DPI information to CSLAF 270 and CSLAF 2770 may use data patterns ML model 450 to process the received DPI information.

Data patterns ML model 450 may be trained to detect malware based on DPI information, detect peer-to-peer file sharing based on the DPI information, detect illegal content based on the DPI information, detect a training data poisoning attack to interfere with ML training based on the DPI information, and/or detect other types of service agreement violations. The output of data patterns ML model 450 may indicate whether an alert should be generated and/or a type of alert that should be generated based on the DPI information.

Additionally, the output of data patterns ML model 450 may indicate whether to cease overriding the maximum throughput enforcement policy (and/or another type of enforcement policy associated with a network slice). For example, data patterns ML model 450 may be configured to obtain a parameter value range for a data traffic parameter for a network slice associated with the PDU session, obtain a parameter value for the data traffic parameter for the PDU session, and determine that the obtained parameter value is outside the obtained parameter value range for the data traffic parameter. If the obtained parameter value is outside the obtained parameter value range for the data traffic parameter, data patterns ML model 450 may indicate hat the maximum throughput enforcement policy (and/or another type of enforcement policy associated with a network slice) should be applied to the PDU session.

Alert generator 460 may generate an alert based on the output of data patterns ML model 450 provided by DPI manager 440. As an example, alert generator 460 may generate an alert for OSS 154. The alert may indicate, for example, that the PDU session is associated with malware, peer-to-peer file sharing, illegal content, a training data poisoning attack, and/or another types of service agreement violation. Additionally, or alternatively, alert generator 460 may generate an alert for UE device 110, indicating that a service agreement violation has been detected and warning UE device 110 that a disciplinary action may be taken with respect to the subscription associated with UE device 110 if the service agreement violation continues.

OSS interface 462 may be configured to communicate with OSS 154. For example, OSS interface 462 may send an alert to OSS 154. UE device interface 464 may be configured to communicate with UE device 110. For example, UE device interface 464 may send an alert and/or warning to UE device 110.

Although FIG. 4 shows exemplary components of CSLAF 270, in other implementations, CSLAF 270 may include fewer components, different components, additional components, or differently arranged components than depicted in FIG. 4. Additionally, or alternatively, one or more components of CSLAF 270 may perform one or more tasks described as being performed by one or more other components of CSLAF 270.

Figure 5:
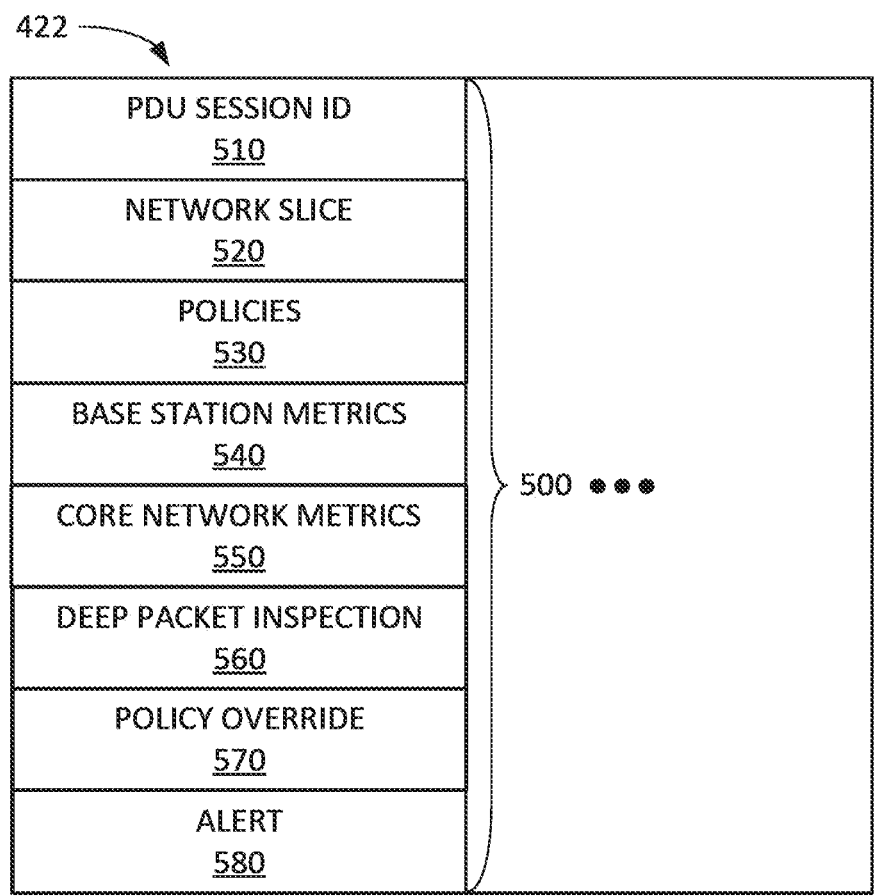
FIG. 5 illustrates exemplary components of a Protocol Data Unit (PDU) sessions database (DB) according to an implementation described herein.

FIG. 5 illustrates exemplary components of PDU sessions DB 422. As shown in FIG. 5, PDU sessions DB 422 may include one or more PDU session records 500. Each PDU session record 500 may include information relating to a PDU session in core network 150. PDU session record 500 may include a PDU session identifier (ID) field 510, a network slice field 520, a policies field 530, a base station metrics field 540, a core network metrics field 550, a deep packet inspection field 560, a policy override field 570, and an alert field 580.

PDU session ID field 510 may store an ID associated with a PDU session. Network slice field 520 may store information identifying the network slice on which PDU session has been established. Policies field 530 may store information identifying a maximum throughput enforcement policy, a minimum latency enforcement policy, a minimum jitter enforcement policy, and/or another performance limiting policy associated with a network slice that may be overridden in situations when the network slice is not experiencing congestion.

Base station metrics field 540 may store information identifying one or more congestion metric values, for base station 130 associated with the PDU session, obtained from RIC 152. For example, base station metrics field 540 may store a PRB utilization rate for each transmission band used by base station 130. Additionally, base station metrics field 540 may store a scheduler load associated with base station 130, a processor load associated with base station 130, a memory utilization rate associated with base station 130, a temperature associated with base station 130, and/or a value for another type of congestion metric.

Core network metrics field 550 may store information identifying one or more congestion metric values, for UPF 230 associated with the PDU session, obtained from NWDAF 268. For example, core network metrics field 550 may store a throughput rate for UPF 230, a packet loss rate for UPF 230, a latency value for UPF 230, a jitter value for UPF 230, a percent of available capacity for UPF 230, a processor load for UPF 230, a memory utilization rate for UPF 230, a forwarding buffer load for UPF 230, and/or a value for another type of congestion metric for UPF 230.

Deep packet inspection field 560 may store information identifying whether a DPI trigger condition for the PDU session has been detected and/or whether DPI has been activated for the PDU session. Policy override field 570 may store information indicating whether any particular policies identified in policies field 530 are being overridden. Alert field 580 may store information indicating whether an alert has been generated and/or sent for the PDU session and, if an alert has been generated, the type of alert that has been generated.

Although FIG. 5 shows exemplary components of PDU sessions DB 422, in other implementations, PDU sessions DB 422 may include fewer components, different components, additional components, or differently arranged components than depicted in FIG. 5.

Figure 6:
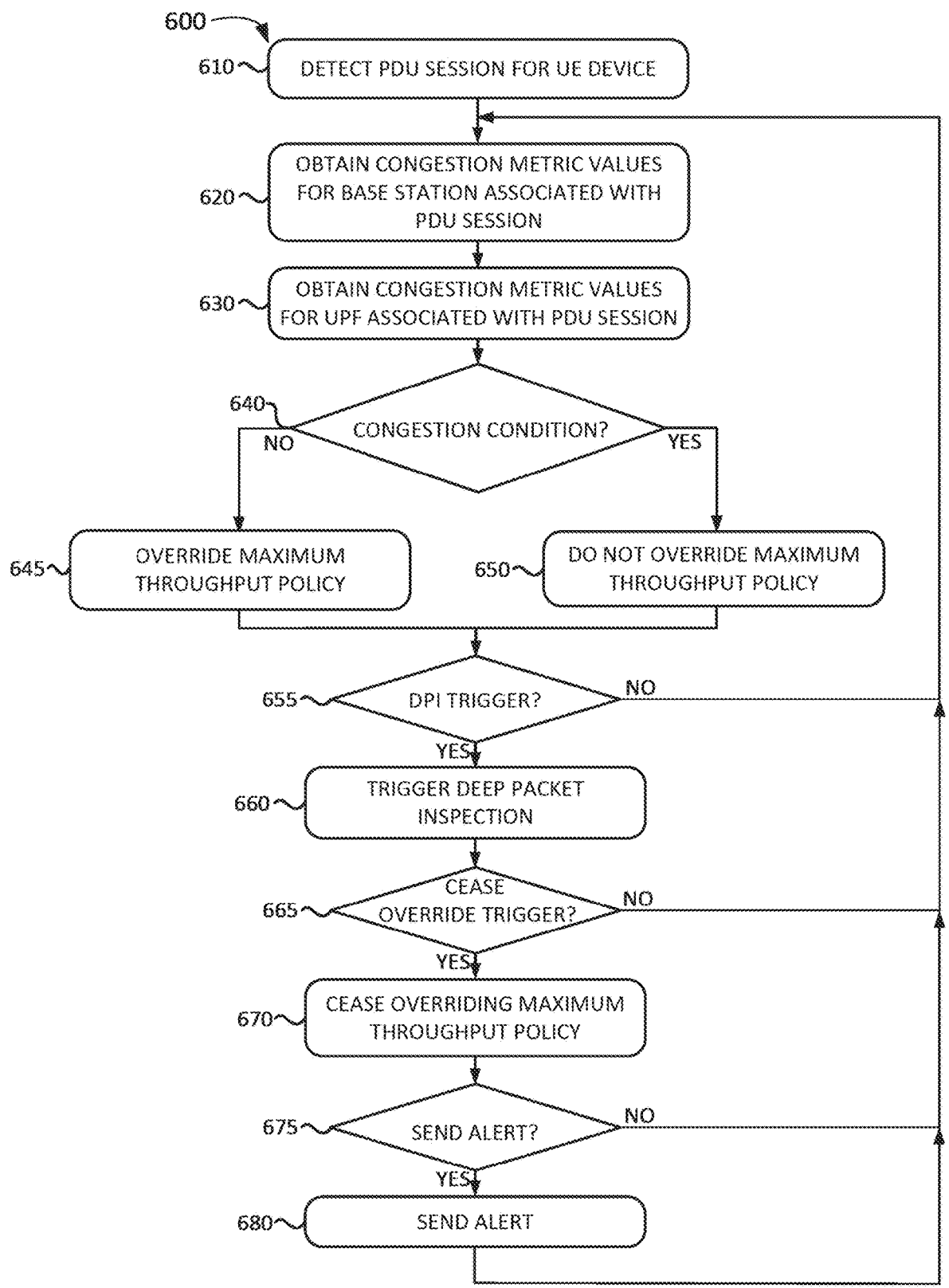
FIG. 6 illustrates a flowchart of a process for congestion and service level aware management of PDU sessions according to an implementation described herein.

FIG. 6 illustrates a flowchart of a process 600 for congestion and service level aware management of PDU sessions. In some implementations, process 600 of FIG. 6 may be performed by CSLAF 270. In other implementations, some or all of process 600 may be performed by another device or a group of devices separate from CSLAF 270.

As shown in FIG. 6, process 600 may include detecting a PDU session for a UE device (block 610). For example, CSLAF 270 may receive an indication from AMF 220 and/or SMF 240 that a PDU session has been established on a particular network slice in core network 150. Process 600 may further include obtaining congestion metric values for a base station associated with the PDU session (block 620) and obtaining congestion metric values for a UPF associated with the PDU session (block 630). For example, CSLAF 270 may obtain congestion metrics associated with base stations 130 from RIC 152 and/or congestion metrics associated with UPFs 230 from NWDAF 268.

A determination may be made as to whether there is a congestion condition (block 640). For example, CSLAF 270 may identify base station 130 and/or UPF 230 based on the PDU session information received from AMF 220 and/or SMF 240 and determine congestion metric values associated with the identified base station 130 and/or UPF 230. CSLAF 270 may determine whether a congestion condition exists based on the determined congestion metric values and threshold information stored in thresholds DB 438.

If it is determined that there is not a congestion condition (block 640—NO), the maximum throughput policy may be overridden (block 645). For example, if base station 130 and/or for UPF 230 is determined to not be in a congestion state, CSLAF 270 may instruct UPF 230, associated with the PDU session, not to enforce a maximum throughput enforcement policy (and/or another type of enforcement policy associated with a network slice). Processing may continue to block 655 to determine whether a DPI trigger has been detected.

If it is determined that there is a congestion condition (block 640—YES), the maximum throughput policy may not be overridden (block 650). For example, if base station 130 and/or for UPF 230 is determined to be in a congestion state, CSLAF 270 may not override the maximum throughput enforcement policy (and/or another type of enforcement policy associated with a network slice) and the maximum throughput enforcement policy may be enforced by UPF 230 associated with the PDU session. Processing may continue to block 655 to determine whether a DPI trigger has been detected.

A determination may be made as to whether a DPI trigger has been detected (block 655). For example, CSLAF 270 may determine whether a DPI trigger has been detected, such as a PDU session duration longer than a duration threshold, a PDU session total amount of uplink data sent greater than an uplink data amount threshold, a PDU session uplink buffer load greater than an uplink data buffer size threshold, an unrecognized DNN (e.g., a DNN that is not on a whitelist associated with a network slice, etc.), and/or other types of trigger conditions. If it is determined that a DPI trigger has been detected (block 655—YES), DPI may be triggered (block 660). For example, if a trigger condition is detected for a PDU session, CSLAF 270 may instruct UPF 330 associated with the PDU session to initiate DPI on the PDU session and processing may continue to block 665. If it is determined that a DPI trigger has not been detected (block 655—NO), processing may return to block 620.

A determination may be made as to whether a cease override trigger has been detected (block 665). For example, CSLAF 270 may obtain DPI information from UPF 230 and provide the obtained DPI information to data patterns ML model 450. Additionally, or alternatively, UPF 230 may access and use data patterns ML model 450. The output of data patterns ML model 450 may indicate whether to cease overriding the maximum throughput enforcement policy (and/or another type of enforcement policy associated with a network slice), if overriding has been initiated for the PDU session. If it is determined that a cease override trigger has been detected (block 665—YES), overriding of the maximum throughput policy may be ceased (block 670). For example, CSLAF 270 may instruct UPF 230 associated with the PDU session to enforce a maximum throughput enforcement policy (and/or another type of enforcement policy associated with a network slice). Processing may continue to block 675. If it is determined that a cease override trigger has not been detected (block 665—NO), processing may return to block 620.

A determination may be made as to whether an alert is to be sent (block 675). For example, the output of data patterns ML model 450 may indicate whether to generate an alert for OSS 154 and/or UE device 110. If it is determined that an alert is to be sent (block 675—YES), an alert may be sent (block 680). For example, CSLAF 270 may send an alert to OSS 154 and/or UE device 110. If it is determined that an alert is not to be sent (block 675—NO), processing may return to block 620.

Figure 7:
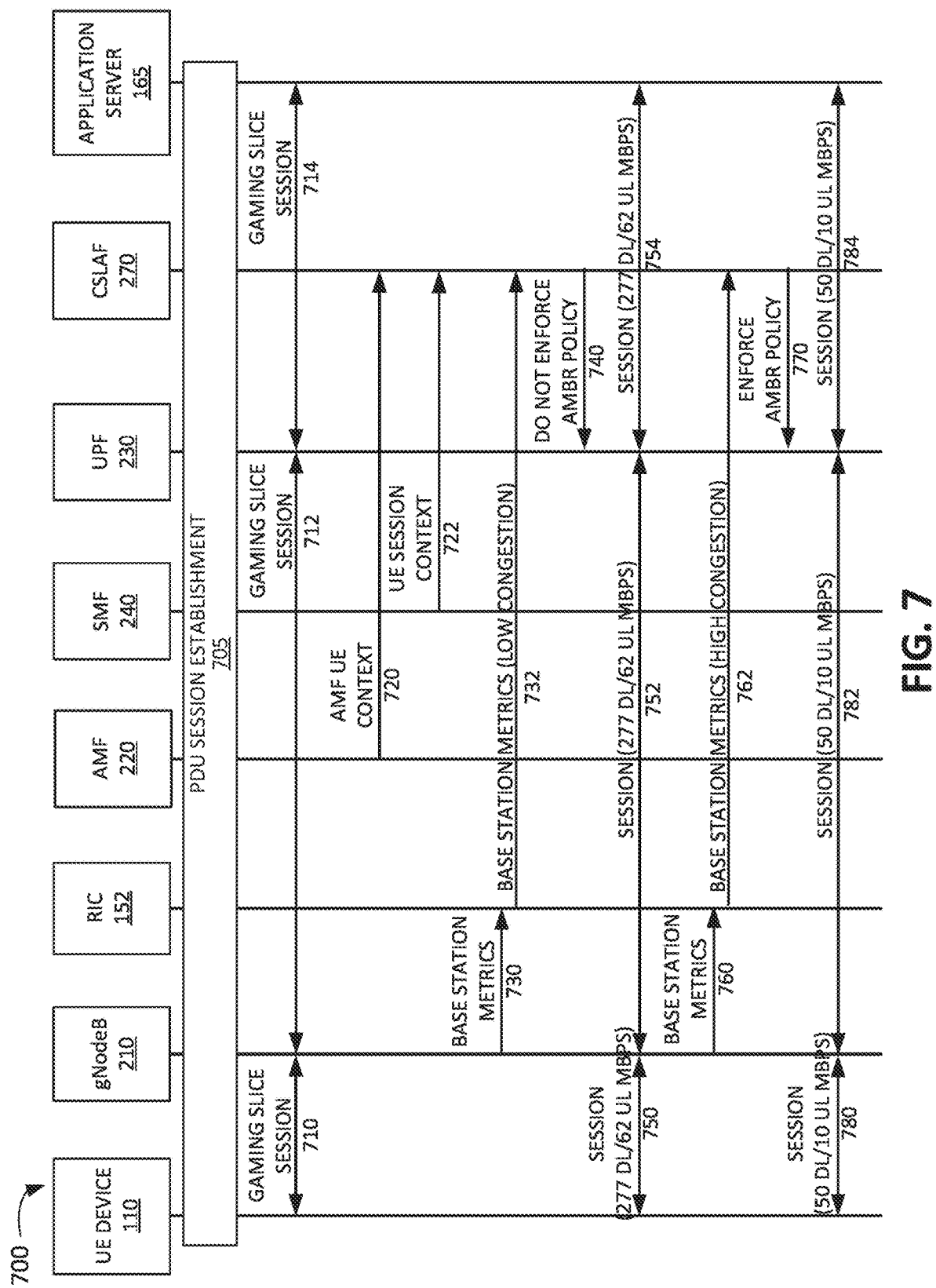
FIG. 7 illustrates a first exemplary signal flow diagram according to an implementation described herein.

FIG. 7 illustrates a first exemplary signal flow diagram 700. Signal flow 700 illustrates use of congestion metrics information to determine whether to override a maximum throughput policy on a low latency gaming slice. The low latency gaming network slice may be capable of supporting download data speeds of up to about 277 Megabits per second (Mbps) and upload data speeds of up to about 62 Mbps. However, in order to reduce abuse of network resources, a maximum throughput policy may be implemented on the low latency gaming network slice, which limits the downlink data speed to about 50 Mbps and uplink data speeds to about 10 Mbps.

Signal flow 700 may include PDU session establishment (block 705). For example, UE device 110 may request an application session with application server 165 for a gaming session. Core network 150 may select the low latency gaming slice and establish a PDU session on the low latency gaming slice between UE device 110 and UPF 230 via gNodeB 210. UE device 110 may start exchanging data with application server 165 on the low latency gaming network slice using the established PDU session via gNodeB 210 and UPF 230 (signals 710, 712, and 714).

AMF 220 may send information relating to the PDU session to CSLAF 270 as AMF UE context information (signal 720) and SMF 240 may send UE session context information to CSLAF 270 (signal 722). Additionally, gNodeB 210 may send base station metrics data to RIC 152 (signal 730) and RIC 152 may send information relating to the received base station metrics data to CSLAF 270 (signal 732). CSLAF 270 may use the received PDU session information to identify gNodeB 210 associated with the PDU session and determine that a PRB utilization rate for gNodeB 210 is less than a PRB utilization rate threshold. In response, CSLAF 270 may override an AMBR policy by instructing UPF 230 not to enforce the AMBR policy (signal 740). As a result, the gaming session may experience download speeds of up to about 277 Mbps and upload speeds of up to about 62 Mbps (signals 750, 752, and 754).

At a later time, gNodeB 210 may experience congestion and a higher PRB utilization rate. gNodeB 210 may report an updated PRB utilization rate to RIC 152 (signal 760). RIC 152 may forward the updated PRB utilization rate to CSLAF 270 (signal 762). CSLAF 270 may determine that the updated PRB utilization rate for gNodeB 210 is greater than the PRB utilization rate threshold. In response, CSLAF 270 may cease overriding the AMBR policy by instructing UPF 230 to enforce the AMBR policy (signal 770). As a result, the gaming session may experience maximum download speeds of about 50 Mbps and maximum upload speeds of up to about 10 Mbps (signals 780, 782, and 784).

Figure 8:
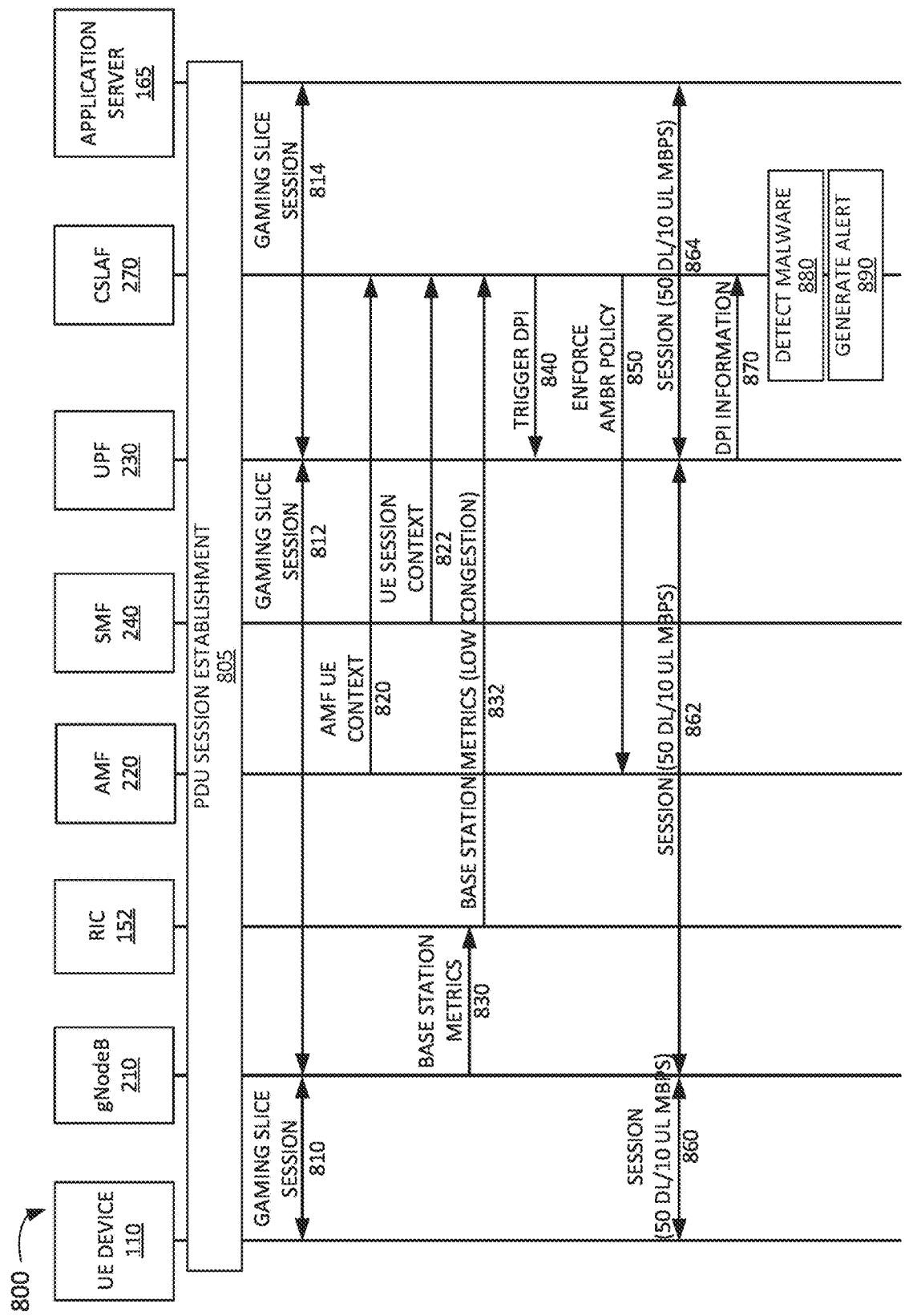
FIG. 8 illustrates a second exemplary signal flow diagram according to an implementation described herein.

FIG. 8 illustrates a second exemplary signal flow diagram 800. Signal flow 800 illustrates the use of DPI on the low latency gaming slice. Signal flow 800 may include PDU session establishment (block 805). For example, UE device 110 may request an application session with application server 165 for a gaming session. Core network 150 may select the low latency gaming slice and establish a PDU session on the low latency gaming slice between UE device 110 and UPF 230 via gNodeB 210. UE device 110 may start exchanging data with application server 165 on the low latency gaming network slice using the established PDU session via gNodeB 210 and UPF 230 (signals 810, 812, and 814).

AMF 220 may send information relating to the PDU session to CSLAF 270 as AMF UE context information (signal 820) and SMF 240 may send UE session context information to CSLAF 270 (signal 822). Additionally, gNodeB 210 may send base station metrics data to RIC 152 (signal 830) and RIC 152 may send information relating to the received base station metrics data to CSLAF 270 (signal 832). CSLAF 270 may use the received PDU session information to identify gNodeB 210 associated with the PDU session and determine that a PRB utilization rate for gNodeB 210 is less than a PRB utilization rate threshold. In response, CSLAF 270 may select to override an AMBR policy. However, CSLAF 270 may detect a DPI trigger condition. For example, CSLAF 270 may detect a total amount of uploaded data that is higher than an upload data amount threshold. In response, CSLAF 270 may trigger DPI on the gaming session by instructing UPF 230 to perform DPI on the gaming session (signal 840). Furthermore, because DPI was triggered, CSLAF 270 may select to enforce the AMBR policy and instruct UPF 230 to enforce the AMBR policy (signal 850). As a result, the gaming session may experience maximum download speeds of 50 Mbps and maximum upload speeds of up to 10 Mbps (signals 860, 862, and 864).

Furthermore, CSLAF 270 may receive DPI information from UPF 230 (signal 870). Using data patterns ML model 450, CSLAF 270 may detect malware in the gaming session data (signal 880) and generate an alert for OSS 154 (signal 890). The alert may be sent to OSS 154 (not shown in FIG. 8). OSS 154 may take action to neutralize the malware and end the gaming session.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 6, and a series of signals have been described with respect to FIGS. 7 and 8, the order of the blocks, and/or signals, may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   detecting, by a device, a Protocol Data Unit (PDU) session associated with a user equipment (UE) device;
   obtaining, by the device, at least one congestion metric value for a base station associated with the PDU session;
   determining, by the device, that the obtained at least one congestion metric value is less than a maximum throughput enforcement threshold; and
   overriding, by the device, a maximum throughput enforcement policy on a User Plane Function (UPF) associated with the UE device, based on determining that the obtained at least one congestion metric value is less than the maximum throughput enforcement threshold.

2. The method of claim 1, wherein the at least one congestion metric value includes:
   a Physical Resource Block (PRB) utilization rate for a radio frequency (RF) band used by the base station;
   a processor load associated with the base station;
   a memory utilization rate associated with the base station; or
   a temperature associated with the base station.

3. The method of claim 1, further comprising:
   obtaining another congestion metric value for the base station;
   determining that the obtained other congestion metric value is greater than the maximum throughput enforcement threshold; and
   ceasing to override the maximum throughput enforcement policy on the UPF associated with the UE device, in response to determining that the obtained other congestion metric value is greater than the maximum throughput enforcement threshold.

4. The method of claim 1, further comprising:
   detecting a triggering condition for performing a deep packet inspection on the PDU session; and
   initiating the deep packet inspection on the PDU session, in response to detecting the triggering condition.

5. The method of claim 4, wherein detecting the triggering condition for performing the deep packet inspection on the PDU session includes at least one of:
   detecting that a duration of the PDU session has exceeded a duration threshold;
   detecting that an amount of data sent by the UE device via the PDU session has exceeded an upload threshold;
   detecting an uplink buffer load that is greater than an uplink buffer load threshold; or
   detecting an unrecognized Data Network Name (DNN).

6. The method of claim 4, further comprising:
   detecting a throughput enforcement triggering condition based on the deep packet inspection; and
   ceasing to override the maximum throughput enforcement policy on the UPF associated with the UE device, in response to detecting the throughput enforcement triggering condition.

7. The method of claim 6, wherein detecting the throughput enforcement triggering condition based on the deep packet inspection includes:
   obtaining a parameter value range for a data traffic parameter for a network slice associated with the PDU session;

obtaining a parameter value for the data traffic parameter for the PDU session; and
determining that the obtained parameter value is outside the obtained parameter value range for the data traffic parameter.

8. The method of claim 4, further comprising:
detecting an alerting condition based on the deep packet inspection; and
sending an alert to an Operations Support System (OSS) based on detecting the alerting condition.

9. The method of claim 8, wherein detecting the alerting condition based on the deep packet inspection includes at least one of:
detecting malware based on the deep packet inspection;
detecting peer-to-peer file sharing based on the deep packet inspection;
detecting illegal content based on the deep packet inspection; or
detecting a training data poisoning attack based on the deep packet inspection.

10. The method of claim 1, wherein the PDU session is assigned to a low latency network slice, and wherein the maximum throughput enforcement policy is associated with the low latency network slice.

11. The method of claim 1, further comprising:
obtaining a congestion metric value for the UPF;
determining that the obtained congestion metric value for the UPF is less than a UPF congestion threshold; and
wherein overriding the maximum throughput enforcement policy on the UPF associated with the UE device is further based on determining that the obtained congestion metric value for the UPF is less than the UPF congestion threshold.

12. The method of claim 1, further comprising:
overriding at least one of a latency enforcement policy or a jitter enforcement policy based on determining that the obtained at least one congestion metric value is less than the maximum throughput enforcement threshold.

13. A device comprising:
a processor configured to:
detect a Protocol Data Unit (PDU) session associated with a user equipment (UE) device;
obtain at least one congestion metric value for a base station associated with the PDU session;
determine that the obtained at least one congestion metric value is less than a maximum throughput enforcement threshold; and
override a maximum throughput enforcement policy on a User Plane Function (UPF) associated with the UE device, based on determining that the obtained at least one congestion metric value is less than the maximum throughput enforcement threshold.

14. The device of claim 13, wherein the at least one congestion metric value includes:
a Physical Resource Block (PRB) utilization rate for a radio frequency (RF) band used by the base station;
a processor load associated with the base station;
a memory utilization rate associated with the base station; or
a temperature associated with the base station.

15. The device of claim 13, wherein the processor is further configured to:
obtain another congestion metric value for the base station;
determine that the obtained other congestion metric value is greater than the maximum throughput enforcement threshold; and
cease to override the maximum throughput enforcement policy on the UPF associated with the UE device, in response to determining that the obtained other congestion metric value is greater than the maximum throughput enforcement threshold.

16. The device of claim 13, wherein the processor is further configured to:
detect a triggering condition for performing a deep packet inspection on the PDU session; and
initiate the deep packet inspection on the PDU session, in response to detecting the triggering condition.

17. The device of claim 16, wherein, when detecting the triggering condition for performing the deep packet inspection on the PDU session, the processor is further configured to at least one of:
detect that a duration of the PDU session has exceeded a duration threshold;
detect that an amount of data sent by the UE device via the PDU session has exceeded an upload threshold;
detect an uplink buffer load that is greater than an uplink buffer load threshold; or
detect an unrecognized Data Network Name (DNN).

18. The device of claim 16, wherein the processor is further configured to:
detect a throughput enforcement triggering condition based on the deep packet inspection; and
cease to override the maximum throughput enforcement policy on the UPF associated with the UE device, in response to detecting the throughput enforcement triggering condition.

19. The device of claim 16, wherein the processor is further configured to:
detect an alerting condition based on the deep packet inspection; and
send an alert to an Operations Support System (OSS) based on detecting the alerting condition.

20. A non-transitory computer-readable memory device storing instructions executable by a processor, the non-transitory computer-readable memory device comprising:
one or more instructions to detect a Protocol Data Unit (PDU) session associated with a user equipment (UE) device;
one or more instructions to obtain at least one congestion metric value for a base station associated with the PDU session;
one or more instructions to determine that the obtained at least one congestion metric value is less than a maximum throughput enforcement threshold; and
one or more instructions to override a maximum throughput enforcement policy on a User Plane Function (UPF) associated with the UE device, based on determining that the obtained at least one congestion metric value is less than the maximum throughput enforcement threshold.

* * * * *